United States Patent
Noguchi et al.

(10) Patent No.: US 6,783,724 B2
(45) Date of Patent: Aug. 31, 2004

(54) METHOD OF PRODUCING CORDIERITE CERAMIC HONEYCOMB

(75) Inventors: Yasushi Noguchi, Nagoya (JP); Kyoko Makino, Nagoya (JP)

(73) Assignee: NGK Insulators, Ltd. (JP)

(*) Notice: Subject to any disclaimer, the term of this patent is extended or adjusted under 35 U.S.C. 154(b) by 21 days.

(21) Appl. No.: 09/980,940

(22) PCT Filed: Apr. 6, 2001

(86) PCT No.: PCT/JP01/03006

§ 371 (c)(1),
(2), (4) Date: Mar. 4, 2002

(87) PCT Pub. No.: WO01/77043

PCT Pub. Date: Oct. 18, 2001

(65) Prior Publication Data

US 2003/0102606 A1 Jun. 5, 2003

(30) Foreign Application Priority Data

Apr. 7, 2000 (JP) ........................... 2000-105869

(51) Int. Cl.$^7$ .................................................. B28B 3/20
(52) U.S. Cl. ........................................ 264/631; 264/638
(58) Field of Search ................................ 264/630, 631, 264/638, 660

(56) References Cited

U.S. PATENT DOCUMENTS 6,391,813 B1 * 5/2002 Merkel ........................ 501/119

FOREIGN PATENT DOCUMENTS

| JP | 64-3067 | 1/1989 |
|---|---|---|
| JP | 2-111659 | 4/1990 |
| JP | 4-305076 | 10/1992 |
| JP | 5-85813 | 4/1993 |
| JP | 5-85856 | 4/1993 |
| JP | 5-254958 | 10/1993 |
| JP | 11-79831 | 3/1999 |
| JP | 11-100259 | 4/1999 |
| JP | 11-236262 | 8/1999 |
| JP | 11-309380 | 11/1999 |

* cited by examiner

*Primary Examiner*—Christopher A. Fiorilla
(74) *Attorney, Agent, or Firm*—Parkhurst & Wendel, L.L.P.

(57) ABSTRACT

A method of producing a cordierite ceramic honeycomb including the steps of: preparing raw materials becoming cordierite and forming agents; adding the forming agents into the raw materials for cordierite generation; mixing the forming agents and the raw materials to obtain a raw material batch; extruding the raw material batch to obtain a formed body; drying the formed body; and sintering the formed body after drying; so as to obtain a honeycomb structural body having a cordierite crystal phase as a main ingredient. In this method, at the sintering step, a temperature descending rate at least from a maximum temperature to 1300° C. is not larger than 100° C./hour.

14 Claims, 1 Drawing Sheet

METHOD OF PRODUCING CORDIERITE CERAMIC HONEYCOMB

This application is a 371 of PCT/JP01/03006 filed Apr. 6, 2001.

TECHNICAL FIELD

The present invention relates to a method of producing a cordierite ceramic honeycomb having a cordierite as a main ingredient of a crystal phase.

BACKGROUND ART

Generally, a cordierite ceramic honeycomb structural body is obtained by the steps of preparing raw materials becoming cordierite and forming agents, adding the forming agents into the raw materials becoming cordierite, mixing the forming agents and the raw materials becoming cordierite to obtain a raw material batch, extruding the raw material batch to obtain a formed body, drying the formed body, and sintering the formed body after drying. In the cordierite ceramic honeycomb structural body mentioned above, as a method of obtaining a cordierite ceramic honeycomb having a low thermal expansion coefficient, there is disclosed a method, in Japanese Patent Publication No. 5-82343, such that a cordierite ceramic honeycomb having a porosity of 30–42%, a thermal expansion coefficient along A-axis of not larger than $0.3\times10^{-6}/°$ C. and a thermal expansion coefficient along B-axis of not larger than $0.5\times10^{-6}/°$ C. is obtained by using talc having average particle size of 5–100 μm, alumina having an average particle size of not larger than 2 μm and high-purity amorphous silica having an average particle size of not larger than 15 μm. Moreover, there is disclosed a cordierite ceramic honeycomb, in Japanese Patent Publication No. 4-70053, having a porosity of not larger than 30%, a thermal expansion coefficient along A-axis of not larger than $0.8\times10^{-6}/°$ C. and a thermal expansion coefficient along B-axis of not larger than $1.0\times10^{-6}/°$ C.

Recently, it is highly required to produce a thin wall honeycomb whose rib thickness is not larger than 100 μm. In this case, in order to carry a catalyst easily, it is preferred to set a porosity of the honeycomb to not less than 30%. In addition, in order to prevent a rib failure, it is necessary to exclude coarse particles having a particle size larger than a slit width of a die from raw materials. However, in the known techniques mentioned above, there arise following problems. That is to say, fine alumina having an average particle size of not larger than 2 μm used as one of raw materials has an advantage such that it decreases a thermal expansion coefficient. On the other hand, since fine alumina mentioned above has a strong particle agglomerating property and it is difficult to perform a classification, it is not possible to eliminate coarse particles form fine alumina. Therefore, alumina coarse particles remaining in fine alumina block a slit of the die during a honeycomb forming step utilizing the die, and this causes a rib failure of the formed honeycomb. Moreover, since fine alumina has fine particles as mentioned above, there is a drawback such that fine alumina decreases a porosity of the cordierite ceramic honeycomb. Further, high-purity amorphous silica used as one of raw materials has an advantage such that it decreases a thermal expansion coefficient. On the other hand, there is a drawback such that high-purity amorphous silica decreases a porosity of the cordierite ceramic honeycomb as compared with quartz silica and it is expensive.

DISCLOSURE OF INVENTION

An object of the invention is to eliminate the drawbacks mentioned above and to provide a method of producing a cordierite ceramic honeycomb which can obtain a thin wall honeycomb structural body having no rib failure and low thermal expansion coefficient inexpensively.

According to the invention, a method of producing a cordierite ceramic honeycomb comprises the steps of: preparing raw materials becoming cordierite and forming agents; adding the forming agents into the raw materials becoming cordierite; mixing the forming agents and the raw materials to obtain a raw material batch; extruding the raw material batch to obtain a formed body; drying the formed body; and sintering the formed body after drying; so as to obtain a honeycomb structural body having a cordierite crystal phase as a main ingredient, wherein, at the sintering step, a temperature descending rate at least from a maximum temperature to 1300° C. is not larger than 100° C./hour.

In the present invention, since, at the sintering step, a temperature descending rate at least from a maximum temperature to 1300° C. is not larger than 100° C./hour, it is possible to obtain a cordierite ceramic honeycomb having no rib failure and low thermal expansion coefficient inexpensively.

In a preferred embodiment of the present invention, quartz is used in a raw material batch becoming cordierite and alumina having an average particle size larger than 2 μm is used. In this case, it is possible to obtain a honeycomb structural body inexpensively as compared with a honeycomb structural body obtained according to the known producing method. The thus obtained cordierite ceramic honeycomb shows a property such that a thermal expansion coefficient along A-axis is not larger than $0.4\times10^{-6}/°$ C. and a thermal expansion coefficient along B-axis is not larger than $0.6\times10^{-6}/°$ C. in a temperature range between 40° C. and 800° C. In the preferred embodiment, the thus obtained cordierite ceramic honeycomb shows a property such that a thermal expansion coefficient along A-axis is not larger than $0.3\times10^{-6}/°$ C. and a thermal expansion coefficient along B-axis is not larger than $0.5\times10^{-6}/°$ C. Further, a porosity of the cordierite ceramic honeycomb is larger than 30%. In addition, when lauric acid potash soap is used as a forming agent, when a temperature descending rate from a maximum temperature to 1250° C. is not larger than 50° C./hour, or, when a temperature maintaining time at a maximum material is not less than 6 hours, the present invention can be achieved more preferably.

BEST MODE FOR CARRYING OUT THE INVENTION

Figure 1:
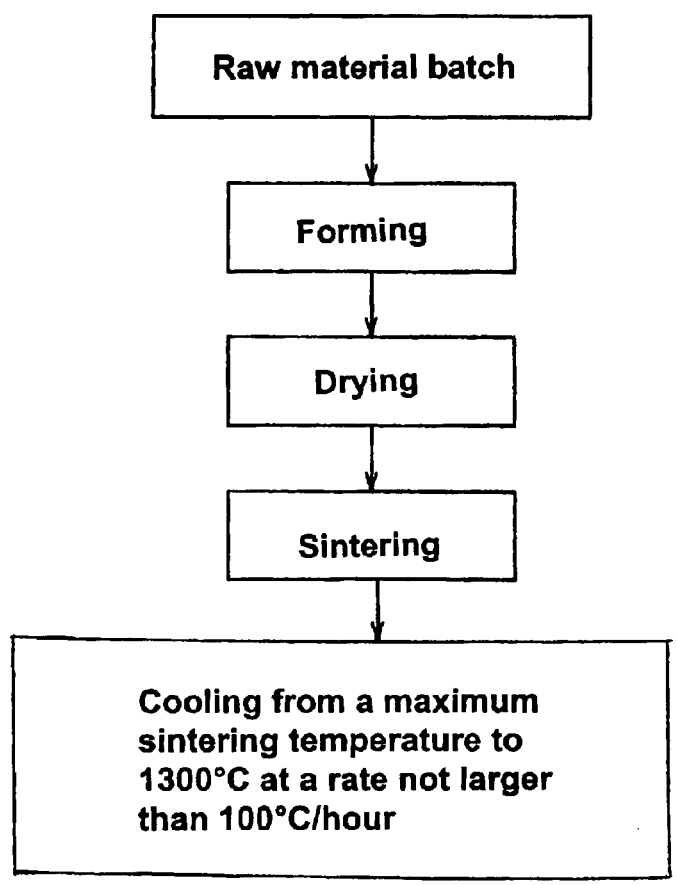
FIG. 1 is a flowchart showing one embodiment of a method of producing a cordierite ceramic honeycomb according to the invention.

FIG. 1 is a flowchart showing one embodiment of a method of producing a cordierite ceramic honeycomb according to the invention. The method of producing a cordierite ceramic honeycomb according to the invention will be explained with reference to FIG. 1. At first, a raw material batch becoming cordierite is prepared. The raw material batch is obtained by adding forming agents such as water-soluble cellulosic, surfactant and water into raw materials becoming cordierite including for example talc, kaolin, calcined kaolin, alumina, aluminum hydroxide, quartz and mixing them. Then, the thus obtained raw material batch is extruded by utilizing a die so as to obtain a honeycomb formed body having a cordierite composition. After that, the thus obtained honeycomb formed body is dried up so as to obtain a honeycomb dried-up body. Finally, the thus obtained honeycomb dried-up body is sintered so as to obtain a cordierite ceramic honeycomb.

Features of the present invention are that, at the sintering step, a temperature descending rate at least from a maximum temperature to 1300° C. is set to not larger than 100° C./hour. In the present invention, a temperature descending rate at the sintering step from a maximum temperature is controlled gently such as not larger than 100° C./hour. Therefore, a cordierite crystal phase is increased, and thus it is possible to produce a cordierite ceramic honeycomb having a low thermal expansion coefficient.

In the embodiment mentioned above, it is preferred to use quartz in the raw material batch for cordierite generation and to use alumina having an average particle size larger than 2 $\mu$m. In the present invention, it is possible to use quartz silica instead of high-purity amorphous silica used in the known method. In this case, it is possible to increase a porosity of the honeycomb and to achieve a low cost as compared with the known embodiment in which high-purity amorphous silica is used, and thus this embodiment is preferable. Moreover, the use of alumina having an average particle size larger than 2 $\mu$m functions to make a porosity to a level larger than 30% and to prevent an inclusion of coarse particles which are difficult to classify. Further, the use of lauric acid potash soap as the forming agent functions to obtain a low thermal expansion coefficient, and thus this is also preferable. Furthermore, when a temperature descending rate from a maximum temperature to 1250° C. is not larger than 50° C./hour and when a temperature maintaining time at the maximum temperature is not less than 6 hours, the present invention can be performed more preferably and thus they are a preferred embodiment.

The cordierite ceramic honeycomb obtained according to the producing method of the invention can obtain such an excellent low thermal expansion coefficient that a thermal expansion coefficient along A-axis of the cordierite ceramic honeycomb is not larger than $0.4 \times 10^{-6}$/° C. and a thermal expansion coefficient along B-axis of the cordierite ceramic honeycomb is not larger than $0.6 \times 10^{-6}$/° C., both in a temperature range from 40° C. to 800° C., and further that a temperature expansion coefficient along A-axis of the cordierite ceramic honeycomb is not larger than $0.3 \times 10^{-6}$/° C. and a thermal expansion coefficient along B-axis of the cordierite ceramic honeycomb is not larger than $0.5 \times 10^{-6}$/° C. Moreover, a porosity of the thus obtained cordierite ceramic honeycomb can be larger than 30%, and thus it achieves such an excellent catalyst carrying property that the catalyst can be carrying easily thereon Hereinafter, an actual embodiment will be explained.

According to the producing method mentioned above, raw materials shown in the following Table 1 were mixed at a predetermined rate, and water-soluble cellulosic, surfactant and water were added therein so as to obtain a raw material batch. Then, the raw material batch was subjected to kneading, pugging, extruding and drying so as to obtain a honeycomb dried-up body having a cordierite composition.

TABLE 1

| | Used raw materials and mixing rate | | |
| --- | --- | --- | --- |
| Raw materials | Average particle size ($\mu$m) | +45 $\mu$m remainder (ppm) | Mixing rate (wt %) |
| talc | 9 | 12 | 40 |
| kaolin | 8 | 5 | 18 |
| calcined kaolin | 3 | 8 | 16 |
| alumina | 5 | 14 | 10 |
| aluminum hydroxido | 1.8 | 13 | 10 |
| quartz | 4 | 7 | 6 |

Then, the thus obtained dried-up body was sintered. The sintering of the honeycomb dried-up body was performed at a maximum temperature of 1425° C. on the basis of a sintering condition shown in the following Table 2 by using a commercially available electric furnace with a programming function. Then, honeycomb sintered bodies according to embodiments 1–9 according to the invention and comparative embodiments 21–24. With respect to the thus obtained honeycomb sintered bodies, a porosity and a thermal expansion coefficient were measured respectively. A porosity of the honeycomb sintered body was obtained by measuring an overall small pore volume according to a mercury injection method and calculating it on the basis of the thus measured overall small pore volume. In this case, a true density of cordierite was assumed to be 2.52 g/cm$^3$. This measurement was performed by using Autopore 9405 of micromeritics Co. Moreover, a thermal expansion coefficient of the honeycomb sintered body was measured under a condition such that an extruding direction of the honeycomb was assumed to be an A-axis direction and a direction, which is perpendicular to the honeycomb extruding direction and parallel to a honeycomb grating line, was assumed to be a B-axis direction. Then, a thermal expansion coefficient along a lone was measured along both A-axis and B-axis directions respectively in a temperature range of 40–800° C. The results were shown in the following Table 2.

TABLE 2

| | Embodiments | | | | | |
|---|---|---|---|---|---|---|
| | Sintering condition | | | | Thermal expansion coefficient ($\times 10^{-6}/°$ C.) | |
| No. | Temperature maintaining time at maximum temperature (hr) | Temperature descending rate (° C./hr) | Cooling temperature (° C.) | Porosity (%) | A-axis | B-axis |
| 1 | 12 | 100 | 1250 | 32.0 | 0.30 | 0.60 |
| 2 | 12 | 75 | 1250 | 32.3 | 0.27 | 0.57 |
| 3 | 12 | 50 | 1250 | 31.7 | 0.22 | 0.50 |
| 4 | 12 | 25 | 1250 | 31.9 | 0.24 | 0.52 |
| 5 | 12 | 25 | 1200 | 31.6 | 0.17 | 0.43 |
| 6 | 12 | 25 | 1000 | 31.3 | 0.20 | 0.48 |
| 7 | 6 | 25 | 1200 | 32.5 | 0.31 | 0.57 |
| 8 | 4 | 75 | 1200 | 33.1 | 0.40 | 0.61 |
| 9 | 12 | 100 | 1300 | 32.4 | 0.37 | 0.61 |
| 21 | 2 | 300 | 1250 | 31.7 | 0.57 | 0.77 |
| 22 | 12 | 150 | 1250 | 32.1 | 0.38 | 0.62 |
| 23 | 12 | 300 | 1250 | 31.7 | 0.46 | 0.65 |
| 24 | 12 | 100 | 1350 | 32.3 | 0.42 | 0.63 |

From the results shown in Table 2, the followings were understood. When a cooling from the maximum temperature became slower, a thermal expansion coefficient was lowered correspondingly. An effect of lowering a thermal expansion coefficient was sufficient is a temperature descending rate was not larger than 50° C./hour (referred to embodiments 1–4, particularly embodiments 3 and 4 being the same value). On the other hand, if a temperature descending rate became faster such as not less than 150° C./hour, a thermal expansion coefficient became higher (referred to comparative embodiments 21–23). The slow cooling from the maximum temperature was effective if it was performed from the maximum temperature to 1300° C. (referred to embodiment 9). Moreover, if the slow cooling was performed to 1200° C., a more effective advantage could be obtained (referred to embodiments 5, 7 and 8). If the slow cooling was performed to a lower temperature than 1200° C., an advantage higher than that of the above cases could not be obtained (referred to embodiment 6). On the other hand, when the slow cooling was not performed only to 1350° C. an advantage was little (referred to comparative embodiment 24). When a temperature maintaining time at the maximum temperature became longer, a thermal expansion coefficient was lowered correspondingly. If the temperature maintaining time was at least 4 hours or more, a low thermal expansion coefficient could be obtained (referred to embodiments 2, 5, 7 and 8). If the temperature maintaining time at the maximum temperature became shorter and the cooling rate became faster as shown in the comparative embodiment 21, an extraordinarily high thermal expansion coefficient was obtained.

INDUSTRIAL APPLICABILITY

As can be understood from the above explanations, according to the invention, since, at the sintering step, a temperature descending rate at least from a maximum temperature to 1300° C. is not larger than 100° C./hour, it is possible to obtain a cordierite ceramic honeycomb having no rib failure and low thermal expansion coefficient inexpensively.

What is claimed is:

1. A method of producing a cordierite ceramic honeycomb comprising the steps of:
    preparing raw materials becoming cordierite and forming agents;
    adding the forming agents into the raw materials becoming cordierite;
    mixing the forming agents and the raw materials to obtain a raw material batch;
    extruding the raw material batch to obtain a formed body;
    drying the formed body; and
    sintering the formed body after drying, so as to obtain a honeycomb structural body having a cordierite crystal phase as a main ingredient, wherein, at the sintering step, a temperature descending rate at least from a maximum temperature greater than 1300° C. to 1300° C. is not larger than 100° C./hour, and wherein quartz is used in the raw material batch becoming cordierite and alumina having an average particle size larger than 2 $\mu$m is used.

2. The method of producing a cordierite ceramic honeycomb according to claim 1, wherein a thermal expansion coefficient along the A-axis of the cordierite ceramic honeycomb is not larger than $0.4 \times 10^{-6}/°$ C. and a thermal expansion coefficient along the B-axis of the cordierite ceramic honeycomb is not larger than $0.6 \times 10^{-6}/°$ C., in a temperature range from 40° C. to 800° C.

3. The method of producing a cordierite ceramic honeycomb according to claim 1, wherein a thermal expansion coefficient along the A-axis of the cordierite ceramic honeycomb is not larger than $0.3 \times 10^{-6}/°$ C. and a thermal expansion coefficient along the B-axis of the cordierite ceramic honeycomb is not larger than $0.5 \times 10^{-6}/°$ C.

4. The method of producing a cordierite ceramic honeycomb according to claim 1, wherein a porosity of the cordierite ceramic honeycomb is larger than 30%.

5. The method of producing a cordierite ceramic honeycomb according to claim 1, wherein a temperature maintaining time at the maximum temperature is not less than 6 hours.

6. A method of producing a cordierite ceramic honeycomb comprising the steps of:
    preparing raw materials becoming cordierite and forming agents;
    adding the forming agents into the raw materials becoming cordierite;
    mixing the forming agents and the raw materials to obtain a raw material batch;

extruding the raw material batch to obtain a formed body;

drying the formed body; and sintering the formed body after drying, so as to obtain a honeycomb structural body having a cordierite crystal phase as a main ingredient, wherein, at the sintering step, a temperature descending rate at least from a maximum temperature greater than 1300° C. to 1300° C. is not larger than 100° C./hour, and wherein lauric acid potash soap is used as a forming agent.

7. The method of producing a cordierite ceramic honeycomb according to claim 6, wherein a thermal expansion coefficient along the A-axis of the cordierite ceramic honeycomb is not larger than $0.4 \times 10^{-6}/°$ C. and a thermal expansion coefficient along the B-axis of the cordierite ceramic honeycomb is not larger than $0.6 \times 10^{-6}/°$ C., in a temperature range from 40° C. to 800° C.

8. The method of producing a cordierite ceramic honeycomb according to claim 6, wherein a temperature maintaining time at the maximum temperature is not less than 6 hours.

9. A method of producing a cordierite ceramic honeycomb comprising the steps of:

preparing raw materials becoming cordierite and forming agents;

adding the forming agents into the raw materials becoming cordierite;

mixing the forming agents and the raw materials to obtain a raw material batch;

extruding the raw material batch to obtain a formed body;

drying the formed body; and sintering the formed body after drying, so as to obtain a honeycomb structural body having a cordierite crystal phase as a main ingredient, wherein, at the sintering step, a temperature descending rate at least from a maximum temperature greater than 1300° C. to 1300° C. is not larger than 100° C./hour, and wherein a temperature descending rate from the maximum temperature to 1250° C. is not larger than 50° C./hour.

10. The method of producing a cordierite ceramic honeycomb according to claim 9, wherein a thermal expansion coefficient along the A-axis of the cordierite ceramic honeycomb is not larger than $0.4 \times 10^{-6}/°$ C. and a thermal expansion coefficient along the B-axis of the cordierite ceramic honeycomb is not larger than $0.6 \times 10^{-6}/°$ C., in a temperature range from 40° C. to 800° C.

11. The method of producing a cordierite ceramic honeycomb according to claim 9, wherein a temperature maintaining time at the maximum temperature is not less than 6 hours.

12. A method of producing a cordierite ceramic honeycomb comprising the steps of:

preparing raw materials becoming cordierite and forming agents;

adding the forming agents into the raw materials becoming cordierite;

mixing the forming agents and the raw materials to obtain a raw material batch;

extruding the raw material batch to obtain a formed body;

drying the formed body; and sintering the formed body after drying, so as to obtain a honeycomb structural body having a cordierite crystal phase as a main ingredient, wherein, at the sintering step, a temperature descending rate at least from a maximum temperature greater than 1300° C. to 1300° C. is not larger than 100° C./hour, and wherein the maximum temperature is 1425° C.

13. The method of producing a cordierite ceramic honeycomb according to claim 12, wherein a thermal expansion coefficient along the A-axis of the cordierite ceramic honeycomb is not larger than $0.4 \times 10^{-6}/°$ C. and a thermal expansion coefficient along the B-axis of the cordierite ceramic honeycomb is not larger than $0.6 \times 10^{-6}/°$ C., in a temperature range from 40° C. to 800° C.

14. The method of producing a cordierite ceramic honeycomb according to claim 12, wherein a temperature maintaining time at the maximum temperature is not less than 6 hours.

* * * * *